US008691429B2

(12) United States Patent
Kim et al.

(10) Patent No.: US 8,691,429 B2
(45) Date of Patent: Apr. 8, 2014

(54) POLYMER BATTERY PACK AND METHOD FOR MANUFACTURING THE SAME

(75) Inventors: Heongsin Kim, Suwon-si (KR); Seok Koh, Suwon-si (KR); Youngcheol Jang, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 899 days.

(21) Appl. No.: 12/576,838

(22) Filed: Oct. 9, 2009

(65) Prior Publication Data

US 2010/0092859 A1    Apr. 15, 2010

Related U.S. Application Data

(60) Provisional application No. 61/105,313, filed on Oct. 14, 2008.

(51) Int. Cl.
*H01M 2/04* (2006.01)
*H01M 2/10* (2006.01)

(52) U.S. Cl.
USPC ............................ 429/178; 429/163; 429/186

(58) Field of Classification Search
USPC ........... 429/96–100, 175, 162, 185, 164, 174, 429/178, 163–187; 156/60; 29/623.1–623.5; 174/257
See application file for complete search history.

(56) References Cited

U.S. PATENT DOCUMENTS

| 6,218,041 | B1 | 4/2001 | Barbier et al. |
| 2001/0038938 | A1 | 11/2001 | Takahashi et al. |
| 2005/0112415 | A1 | 5/2005 | Takeshita et al. |
| 2005/0214597 | A1* | 9/2005 | Kim et al. .......................... 429/7 |
| 2006/0035141 | A1 | 2/2006 | Lee |
| 2006/0083982 | A1* | 4/2006 | Jung et al. ...................... 429/164 |
| 2006/0199075 | A1 | 9/2006 | Moon et al. |
| 2006/0266542 | A1 | 11/2006 | Yoon |

(Continued)

FOREIGN PATENT DOCUMENTS

| CN | 1670983 | 9/2005 |
| CN | 1713444 A | 12/2005 |

(Continued)

OTHER PUBLICATIONS

Machine Translation of Takeshi (JP 2005-346964 A, Published Dec. 15, 2005).*

(Continued)

*Primary Examiner* — Basia Ridley
*Assistant Examiner* — Caitlin Wilmot
(74) *Attorney, Agent, or Firm* — Knobbe, Martens, Olson & Bear, LLP

(57) ABSTRACT

Disclosed are a polymer battery pack and a method for manufacturing the same. In the polymer battery pack, a bare cell and a protection circuit member are separated from each other by a holder frame such that the bare cell is coupled to the inner side of the holder frame and the protection circuit member is coupled to the outer side of the holder frame. The method for manufacturing the polymer battery pack includes: coupling a bare cell to the inner side of a holder frame; electrically connecting the bare cell to a protection circuit member; coupling the protection circuit module to the holder frame; coupling a cover to the holder frame; attaching an external label to the cover; attaching a water sensitive paper to the cover; and performing a function test for the battery.

16 Claims, 16 Drawing Sheets

(56) References Cited

U.S. PATENT DOCUMENTS

| | | |
|---|---|---|
| 2007/0065718 A1 | 3/2007 | Moon |
| 2010/0173193 A1 | 7/2010 | Kim |
| 2011/0244276 A1 | 10/2011 | Takeshita et al. |

FOREIGN PATENT DOCUMENTS

| | | |
|---|---|---|
| EP | 1 524 710 | 4/2005 |
| EP | 1 524 710 A2 | 4/2005 |
| EP | 1 901 369 | 3/2008 |
| JP | 10-069894 A | 3/1998 |
| JP | 2000-021374 A | 1/2000 |
| JP | 2001-307696 | 11/2001 |
| JP | 2004-127839 A | 4/2004 |
| JP | 2005-142153 A | 6/2005 |
| JP | 2005-346964 A | 12/2005 |
| JP | 2006-324114 | 11/2006 |
| JP | 2008-527678 A | 7/2008 |
| JP | 2009-117263 A | 5/2009 |
| KR | 10 1999 0044976 | 6/1999 |
| KR | 10 2005 0037366 | 4/2005 |
| KR | 10-2006-0071813 | 6/2006 |
| KR | 10-2006-0102823 | 9/2006 |
| KR | 10-2006-0113802 | 11/2006 |

OTHER PUBLICATIONS

EPO, Extended European Search Report for corresponding EPO application 09172907.9, Jan. 21, 2010.

Office Action dated Feb. 20, 2012 for corresponding CN Application No. 2009-10179599.9.

Office Action dated Mar. 16, 2011 for related KR Application No. 10-2009-0097753.

Office Action dated May 18, 2012 for corresponding KR Application 10-2009-0097753.

U.S. Appl. No. 12/643,750, filed Dec. 21, 2009, Joongheon Kim.

Office Action dated Jul. 17, 2012 for corresponding JP Application No. 2009-237104.

Examination Report for related application KR 10-2009-0001452 dated Aug. 11, 2010.

Chinese Office Action dated Oct. 24, 2012 for Chinese Patent Application No. CN 200910179599.9 which claims priority from U.S. Appl. No. 61/105,313, filed Oct. 14, 2008, and captioned U.S. Appl. No. 12/576,838.

\* cited by examiner

POLYMER BATTERY PACK AND METHOD FOR MANUFACTURING THE SAME

RELATED APPLICATIONS

This application claims the benefit of U.S. Provisional Application No. 61/105,313, filed Oct. 14, 2008, entitled "Polymer Battery Pack and Method for Manufacturing the Same", which is hereby incorporated by reference in its entirety herein.

BACKGROUND OF THE INVENTION

1. Field of the Invention

The present invention relates to a polymer battery pack and a method for manufacturing the same, and more particularly, to a polymer battery pack that improves productivity and reduces the number of parts, thereby reducing manufacturing costs, and a method for manufacturing the same.

2. Description of the Related Art

A polymer battery pack generally includes a core pack in which a protection circuit member is electrically connected to a bare cell having a pouch type sheath, and a frame in which the core pack is received. The bare cell refers to a lithium polymer battery in which an electrode assembly and a polymer electrolyte are received in a pouch made of cast polypropylene (CPP), aluminum, or nylon (or polyethylene terephthalate (PET). Here, the polymer battery pack or the lithium polymer battery uses a solid or gel electrolyte instead of a liquefied electrolyte.

A battery pack according to the prior art includes a bare cell, a protection circuit member, and a frame in which the bare cell and the protection circuit member are installed.

Conventionally, the bare cell and the protection circuit member are installed together in the frame. Thus, a gap is generated between the bare cell and the protection circuit member. In order to reduce the gap, a hot-melt resin is injected into the gap or an injection-molded holder is inserted into the gap. Accordingly, the number of parts increases and an additional manufacturing process is necessary.

In addition, since the protection circuit member is installed inside the frame, a hole through which a terminal of the protection circuit member is exposed needs to be formed in the frame. Thus, the mold of the frame becomes complex due to the hole, decreasing productivity and increasing manufacturing costs.

BRIEF SUMMARY OF THE INVENTION

The present invention has been made in view of the above problems, and the present invention provides a polymer battery pack that reduces the number of parts and simplifies manufacturing costs, and a method for manufacturing the same.

The present invention also provides a polymer battery pack that enhances productivity and manufacturing costs, and a method for manufacturing the same.

According to one embodiment of the present invention, since a bare cell is coupled to the inner side of a holder frame and a protection circuit member is coupled to the outer side of the holder frame, it is unnecessary to add a hot-melt resin or a part such as a protection circuit member holder in a space between the bare cell and the protection circuit member.

Furthermore, since the structure of the holder frame coupled to the bare cell is simple, the mold of the holder frame also becomes simple, thereby enhancing productivity and reducing manufacturing costs.

Moreover, the protection circuit member is mechanically coupled to the holder frame. In other words, a cover is coupled to the holder frame with the protection circuit member being firmly fixed to the holder frame and an external label is finally attached to the outer side of the bare cell, thereby enhancing the assembling efficiency and structural strength of the battery pack.

The aforementioned needs are satisfied by one exemplary embodiment of a battery pack which comprises a rigid frame having an inner side that defines a first mounting location and an outer side that defines a second mounting location. In this exemplary embodiment, the battery pack assembly further includes a bare cell that is mounted within the rigid frame in the first mounting location wherein the bare cell includes at least one electrode that extends towards the second mounting location. In this exemplary embodiment, the battery pack assembly further includes a protection circuit module having a first and a second side, wherein the protection circuit module includes at least one electrode lead that is positioned on the first side of the protection circuit module. The protection circuit module is mounted in the second mounting location of the frame and wherein the at least one electrode of the bare cell is electrically connected to the at least one electrode lead of the protection circuit module.

The aforementioned needs are also satisfied by another exemplary embodiment of a battery pack which comprises a frame defining an inner recess that comprises a first mounting location and an outer surface that defines a second mounting location. In this embodiment, the battery pack also includes a bare cell that is mounted within the inner recess of the frame wherein the bear cell includes at least one flexible electrode. The battery pack further includes a protection circuit module having a first and a second side, wherein the protection circuit module includes at least one electrode lead that is positioned on the first side of the protection circuit module so as to be substantially co-planar with the first side of the protection circuit module. The protection circuit module is mounted to the second mounting location and the at least one flexible electrode is contoured so that the flexible electrode is coupled to the at least one electrode lead wherein the at least one electrode lead of the protection circuit module is substantially co-planar with the first side of the protection circuit module and is interposed between the protection circuit module and the frame.

The aforementioned needs are further satisfied by another exemplary embodiment of a method of forming a battery which comprises positioning a bare cell within an opening defined by a frame so that an electrode of the bare cell extends outward of the opening in a first direction so as to be adjacent a first outer surface of the frame that has a component that is generally perpendicular to the first direction. The method further comprises coupling the electrode of the bare cell to an electrode lead of the protection circuit module that is positioned proximate the first outer surface of the frame while the electrode of the bare cell extends in the first direction so that a first surface of the protection circuit module that contains the electrode lead is orientated in a direction that has a component that is perpendicular to the plane of the first outer surface of the frame. The method further comprises orienting the protection circuit module that is coupled to the lead of the bare cell into a mounting orientation so that the first surface of the protection circuit module is positioned proximate the first outer surface of the frame so that the first surface is substantially parallel to the first outer surface of the frame and so that the lead of the bare cell is interposed between the frame and the protection circuit module. The method then further comprises securing the protection circuit module to the frame in the mounting orientation.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
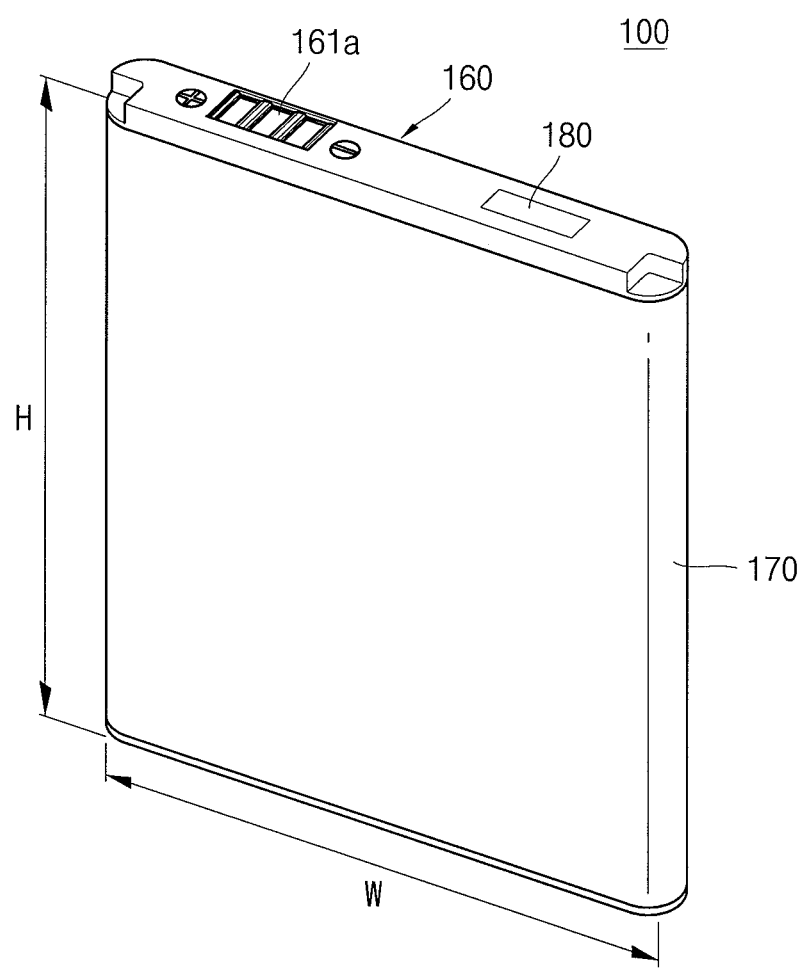
FIG. 1 is a perspective view of a polymer battery pack according to an embodiment of the present invention.
Figure 2:
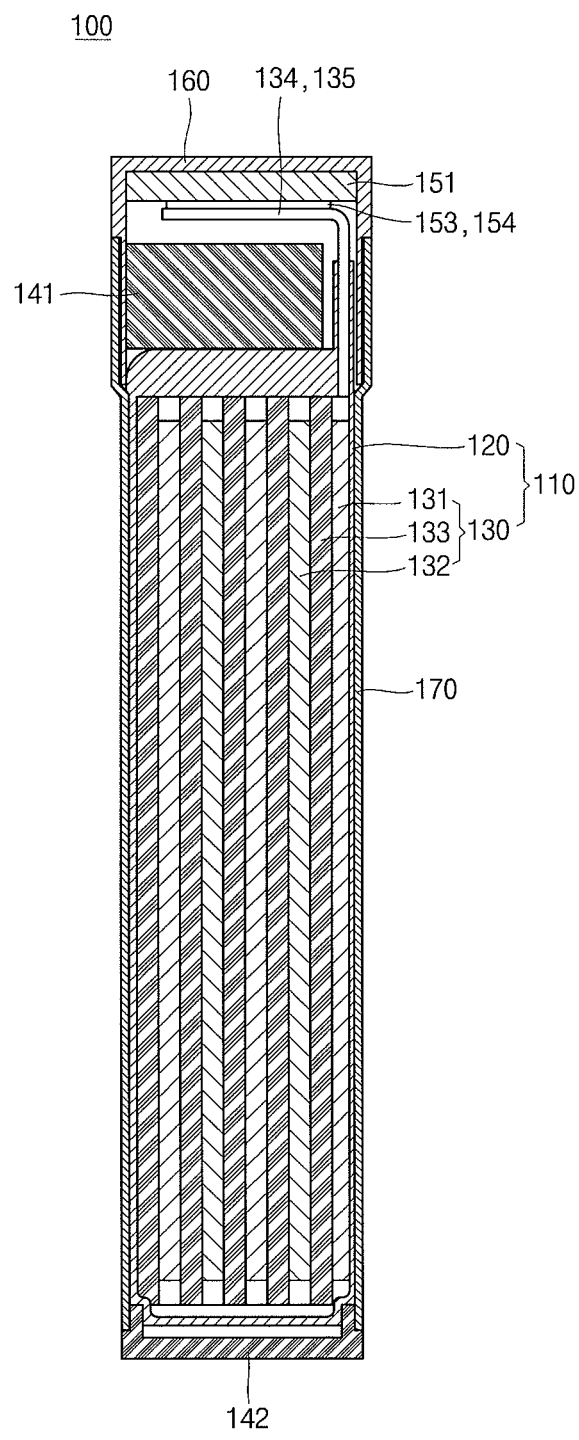
FIG. 2 is a longitudinal sectional view of FIG. 1.
Figure 3:
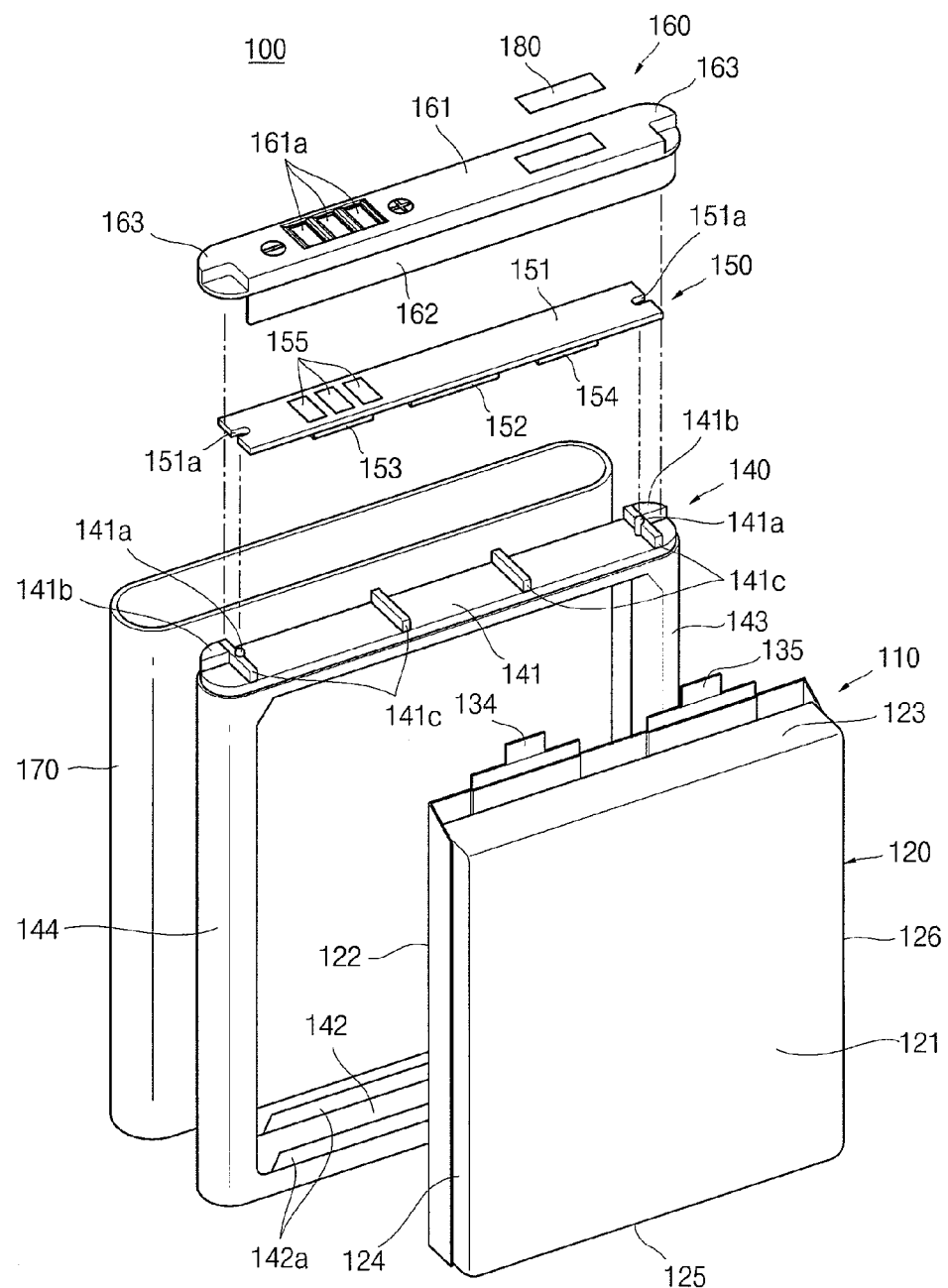
FIG. 3 is an exploded perspective view of FIG. 1.
Figure 4:
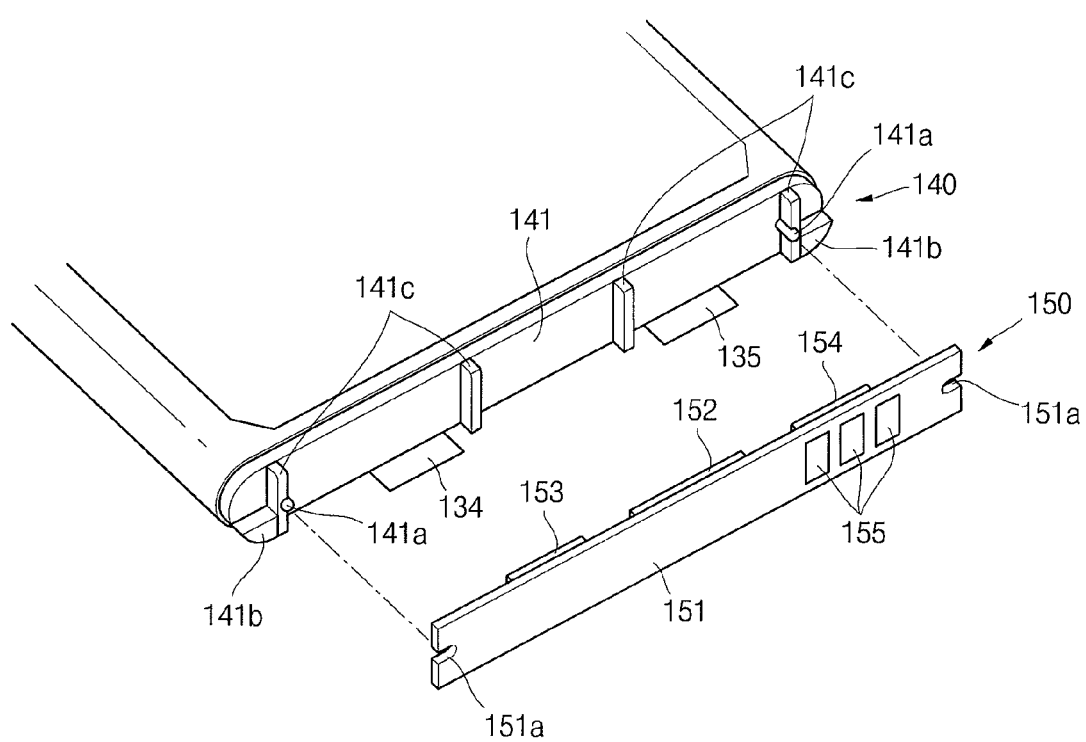
FIG. 4 is a view illustrating a holder frame and a protection circuit member coupled to each other according to the embodiment of the present invention.

Hereinafter, embodiments of the present invention will be described in detail with reference to the accompanying drawings.

First, a polymer battery pack according to an embodiment of the present invention will be described.

Referring to FIGS. 1 to 4, the polymer battery pack 100 according to the embodiment of the present invention includes a bare cell 110, a holder frame 140 surrounding the bare cell 110, a protection circuit member 150 electrically connected to the bare cell 110 and fixed to the holder frame 140, and a cover 160 surrounding the protection circuit member 150 and fixed to the holder frame 140. The polymer battery pack 100 may further include an external label 170 surrounding the bare cell 110 and the holder frame 140, and a water sensitive paper 180 may be attached to the cover 160.

In the polymer battery pack 100 according to the embodiment of the present invention, the bare cell 110 is installed inside the holder frame 140. The protection circuit member 150 is installed outside the holder frame 140.

The bare cell 110 includes a pouch type sheath 120, and an electrode assembly 130 and a polymer electrolyte (not shown) received inside the pouch type sheath 120.

The pouch type sheath 120 includes first and second surfaces 121 and 122 having two corresponding large areas, and third to six surfaces 123 to 126 having relatively small areas and connecting the first and second surfaces 121 and 122. Of the four surfaces 123 to 126, the third surface 123 corresponds to the front surface from which electrode tabs 134 and 135 are withdrawn.

A first insulation layer (not shown) is formed on one surface of the pouch type sheath 120 and a second insulation layer (not shown) is formed on the opposite surface thereof, with a metal layer (not shown) being interposed therebetween. The metal layer may be made of one selected from aluminum, steel, stainless steel, and their equivalents. The first insulation layer may be made of one selected from cast polypropylene (CPP) and its equivalents and the second layer may be made of one selected from polyethylene terephthalate (PET) and its equivalents, but the present invention is not limited thereto.

The electrode assembly 130 is formed by sequentially stacking or winding a positive electrode plate 131, a separator 133, and a negative electrode plate 132. Then, the electrode tabs 134 and 135 attached to the positive electrode plate 131 and the negative electrode plate 132 are withdrawn outside the electrode assembly 130 through the third surface 123 corresponding to the front surface of the pouch type sheath 120.

In the embodiment of the present invention, the polymer electrolyte is a solid electrolyte or a gel electrolyte.

The holder frame 140 has a rectangular frame structure that surrounds the outskirt areas of the bare cell 110.

The holder frame 140 may be made of polyimide, polyurethane, or a plastic. The plastic may be a fiber-reinforced plastic (FRP) or an engineering plastic. The holder frame 140 may be made of a hot-melt resin or its equivalents using injection molding.

The holder frame 140 includes two facing first and second frames 141 and 142, and third and fourth frames 143 and 144 formed relatively long at opposite ends of the first and second frames 141 and 142. The interval H between the first and second frames 141 and 142 corresponds to the height of the bare cell 110, and the interval W between the third and fourth frames 143 and 144 corresponds to the width of the bare cell.

When a surface of the first frame 141 that corresponds to the bare cell 110 is defined as the inner surface thereof and the opposite surface is defined as the outer surface thereof, fixing bosses 141a for fixing the protection circuit member 150 are formed on both sides of the outer surface thereof. The fixing bosses 141a are cylindrical but their shapes are not limited thereto. Protrusions 141b coupled to the cover 160 are formed on the outer surface of the first frame 141 outside the fixing bosses 141a. Four supports 141c supporting the protection circuit member 150 are formed in parallel on the outer surface of the first frame 141. The supports 141c space the protection circuit member 150 apart from the first frame 141 by an interval. Guide ribs 142a are formed at both side edges of the second frame 142. After the bare cell 110 is coupled to the guide ribs 142a, the guide ribs 142a support the lower ends of the first and second surfaces 121 and 122 of the bare cell 110. The third and fourth frames 143 and 144 have the same shapes as those of the fourth and sixth surfaces 124 and 126 of the bare cell 110. Preferably, the third and fourth frames 143 and 144 are rounded in order to protect the fourth and sixth surfaces 124 and 126 of the bare cell 110 from an external force.

The protection circuit member 150 includes a protection circuit board 151, at least one electronic part 152 installed on one surface of the protection circuit board 151, electrode leads 153 and 154 installed on the surface of the protection circuit board 151 where the electronic part 152 is installed, electrically connected to the bare cell 110, and having opposite polarities, and several external terminals 155 installed on the surface of the protection circuit board 151 that is opposite to the surface where the electrode leads 153 and 154 are installed.

The protection circuit board 151 has a plate-like shape, and fixing holes 151a are formed at right and left ends of the protection circuit board 151. The fixing bosses 141a of the first frame 141 are inserted into and coupled to the fixing holes 151a. The fixing holes 151a may have the shapes of recesses instead of those of holes. The electronic part 152 is installed on the surface of the protection circuit board 151 that faces the outer surface of the first frame 141. Accordingly, a space is formed between the first frame 141 and the protection circuit board 151 by the supports 141c formed in the first frame 141, and the electronic part 152 is located in the space. The electrode leads 153 and 154 are installed on the surface of the protection circuit board 151 that faces the outer surface of the first frame 141. The electrode leads 153 and 154 have the opposite polarities. The electrode leads 153 and 154 may be formed on one surface of the protection circuit board 151 in the form of conductive layers. The external terminals 155 are installed on the surface of the protection circuit board 151 that is opposite to the surface where the electrode leads 153 and 154 are installed and are electrically connected to the electrode leads 153 and 154. The external terminals 155 are exposed to the outside through the cover 160 to cause current of the battery to flow to an external device.

The cover 160 has an interior space and has a box-like shape one side surface of which is opened.

The cover 160 may be made of polyimide, polyurethane, or a plastic.

The cover 160 includes a body 161, coupling ribs 162 extending downward from the lower ends of side surfaces of the body 161, and recesses 163 formed at opposite ends of the body 161.

Several external terminal holes 161a are formed in the body 161. The external terminals 155 of the protection circuit member 150 are exposed to the outside through the external terminal holes 161a. The coupling ribs 162 surround the upper ends of the first and second surfaces 121 and 122. The recesses 163 are coupled to the protrusions 141b of the first frame 141. The holder frame 140 and the cover 160 are firmly coupled to each other through the coupling structure.

The external label 170 surrounds the first and second surfaces 121 and 122 of the bare cell 110 and the third and fourth frames 143 and 144 of the holder frame 140. The external label 170 is attached to the surfaces of the bare cell 110 and the holder frames 140 by coating an adhesive or a gluing agent.

The external label 170 may be made of one selected from polyethylene terephthalate (PET) and its equivalents, but the material of the external label 170 is not limited thereto.

Next, the operation of the polymer battery pack according to the embodiment of the present invention will be described.

In the polymer battery pack 100 according to the embodiment of the present invention, the bare cell 110 is installed inside the holder frame 140. In the bare cell 110, the third to sixth surfaces 123 to 126 of the pouch type sheath 120 are surrounded by the first to fourth frames 141 to 144 of the holder frame 140.

The electrode tabs 134 and 135 of the bare cell 110 protrude to the outside of the first frame 141 and are welded to the electrode leads 153 and 154 formed on one surface of the protection circuit board 151. Here, the protection circuit board 151 is installed in parallel to the first frame 141 of the holder frame 140, and the electrode leads 153 and 154 are formed on one surface of the protection circuit board 151 in the form of conductive layers.

The first frame 141 is located between the bare cell 110 and the electrode tabs 134 and 135 in order to insulate the electrode tabs 134 and 135 from the bare cell 110. According to the prior art, an insulation member such as an insulation tape is additionally attached to at least one of bare cell and electrode tabs in order to insulate the electrode tabs from the bare cell, increasing the number of parts and the number of manufacturing processes. As mentioned above, in the polymer battery pack 100 according to the embodiment of the present invention, the bare cell 110 and the protection circuit member 150 are assembled by the holder frame 140, with them being separated from each other, thereby enhancing assembling efficiency and reducing the number of additional parts.

The protection circuit member 150 is coupled to the holder frame 140. In other words, the fixing bosses 141a formed at right and left ends of the first frame 141 are inserted into and fixed to the fixing holes 151a formed at right and left ends of the protection circuit board 151. The fixing holes 151a of the protection circuit board 151 have substantially C- or inverse C-shapes that are opened to the outside. Accordingly, even when the fixing bosses 141a of the first frame 141 do not accurately correspond to the fixing holes 151a, the polymer battery pack 100 can be smoothly assembled.

Next, a method for manufacturing a polymer battery pack according to an embodiment of the present invention will be described in more detail.

The method for manufacturing a polymer battery pack according to the embodiment of the present invention will be described with reference to FIGS. 5A to 5G.

Figure 5A:
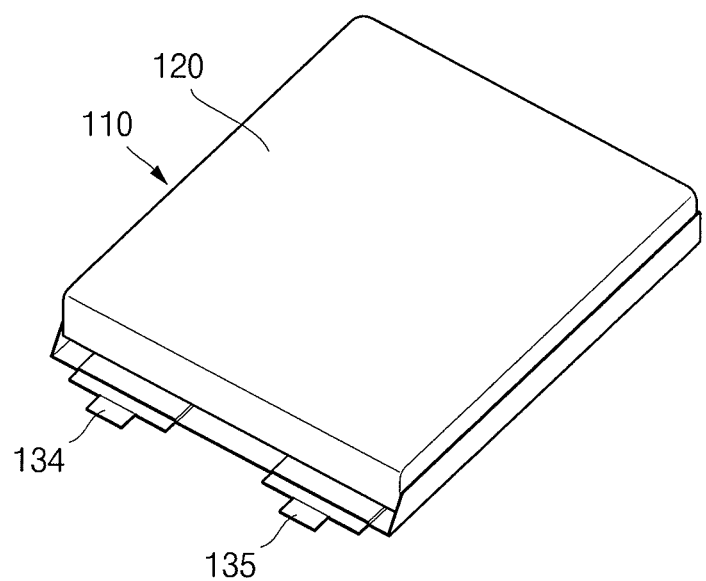
FIGS. 5A to 5G are perspective views illustrating a method for manufacturing a polymer battery pack according to an embodiment of the present invention.

1. Inspecting a Bare Cell and Cutting Electrode Tabs (FIG. 5A)

A finished bare cell 110 is inspected, and electrode tabs 134 and 135 withdrawn outside the bare cell 110 are cut off to a predetermine length. The bare cell 110 is manufactured by receiving an electrode assembly (not shown) inside a pouch type sheath 120 and then fusing four surfaces thereof.

Figure 5B:
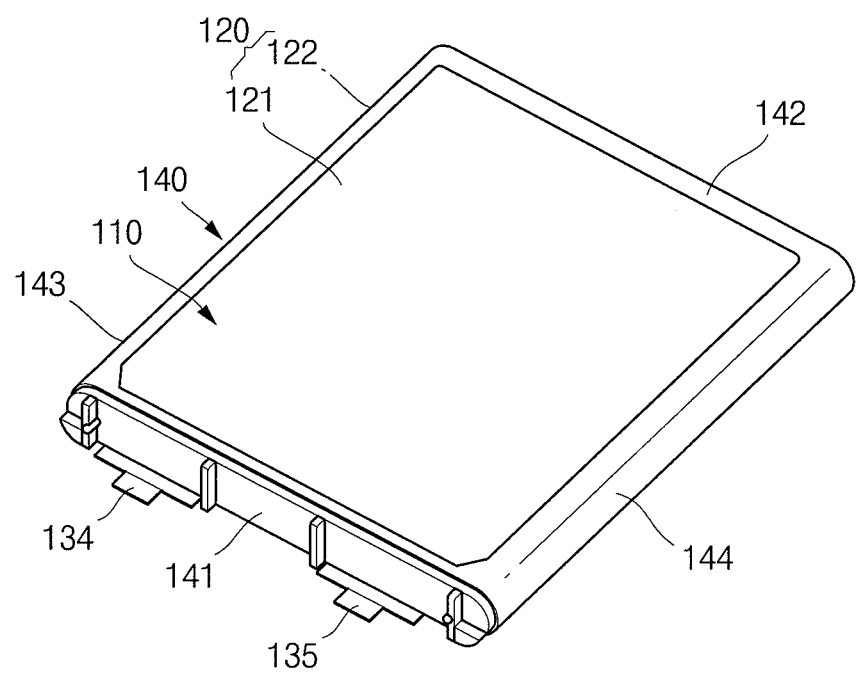

2. Coupling the Bare Cell and a Holder Frame (FIG. 5B)

The bare cell 110 is inserted into a holder frame 140. Once the bare cell 110 is coupled to the holder frame 140, the bare cell 110 is surrounded by first and second frames 141 and 142 and third and fourth frames 143 and 144. Thus, first and second surfaces 121 and 122 of the pouch 120 are exposed to the outside.

Figure 5C:
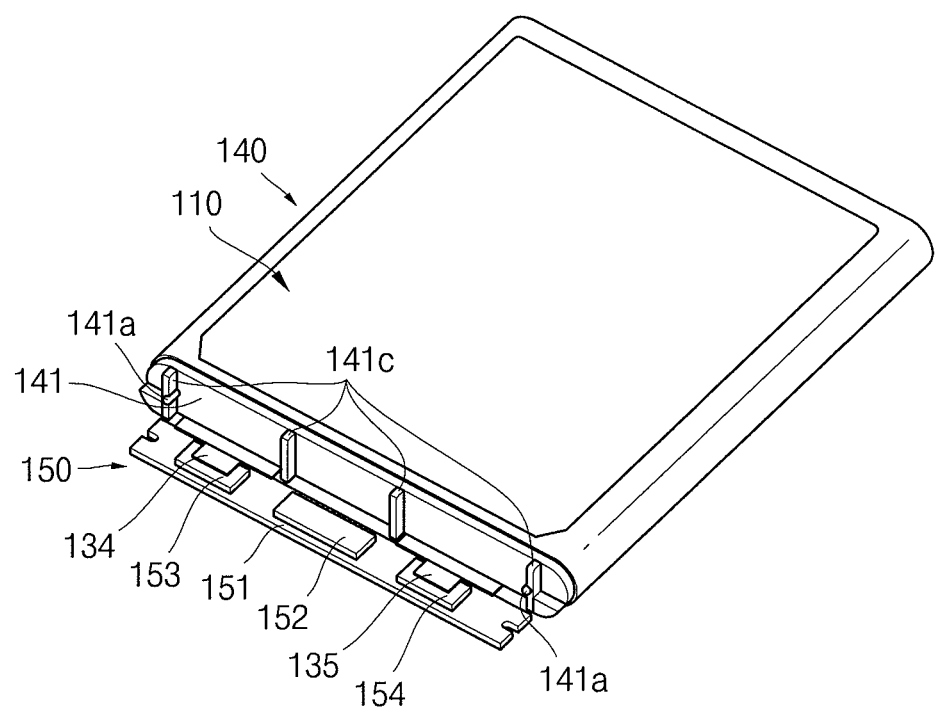

3. Connecting the Bare Cell and a Protection Circuit Member (FIG. 5C)

Electrode tabs 134 and 135 protruding from the bare cell 110 to the outside of the holder frame 140 are welded to electrode leads 153 and 154 of the protection circuit member 150. In other words, the electrode tabs 134 and 135 protruding to the outside of the first frame 141 of the holder frame 140 are welded to the electrode leads 153 and 154 formed on one surface of the protection circuit board 151 in the form of insulation layers respectively. Accordingly, the bare cell 110 and the protection circuit member 150 are electrically connected to each other.

Figure 5D:
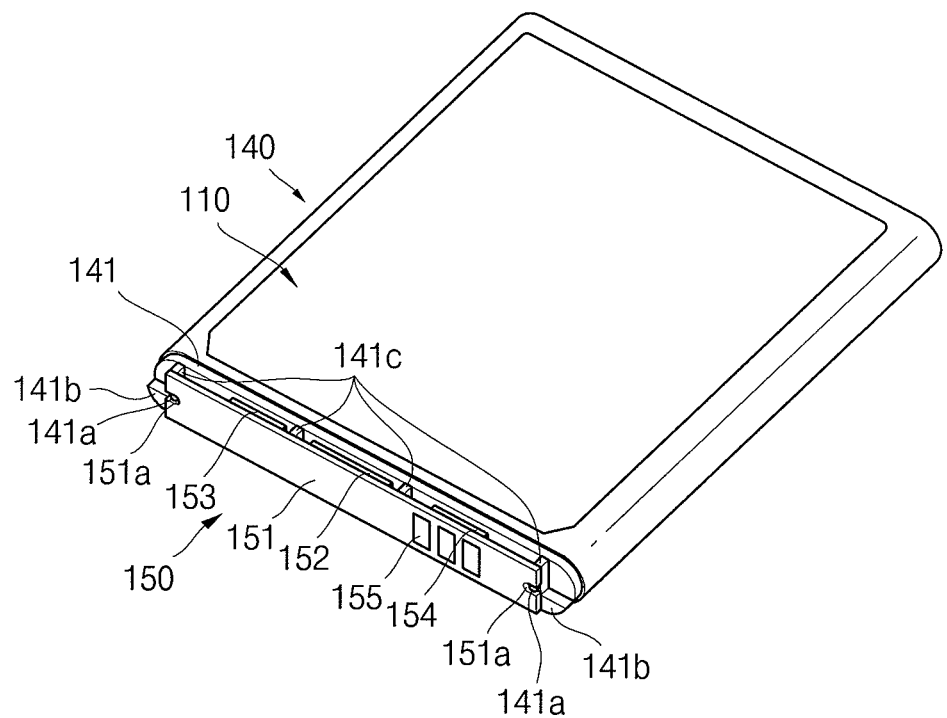

4. Coupling the Protection Circuit Member to the Holder Frame (FIG. 5D)

The protection circuit member 150 is vertically folded toward the holder frame 140. Thus, the electrode tabs 134 and 135 of the bare cell 110 are also bent with the protection circuit board 151 being parallel to the first frame 141. Then, if fixing bosses 141a of the first frame 141 are inserted into fixing holes 151a of the protection circuit board 151, the protection circuit board 151 is fixed to the first frame 141. Accordingly, the protection circuit member 150 is firmly coupled to the holder frame 140.

Then, the protection circuit board 151 is supported by supports 141c of the first frame 141, and a space for locating an electronic part 152 is formed between the protection circuit board 151 and the first frame 141.

Figure 5E:
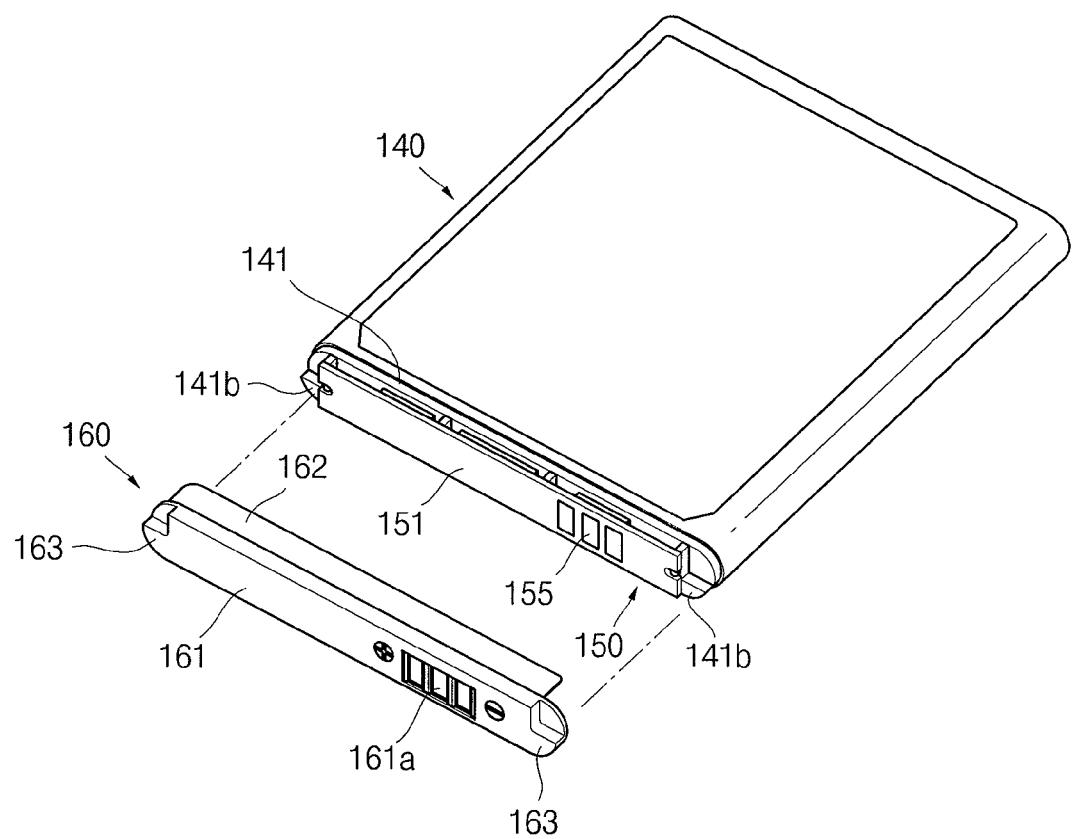

5. Coupling a Cover to the Holder Frame (FIG. 5E)

The cover 160 is coupled to the holder frame 140. That is, the cover 160 is coupled to the first frame 141 of the holder frame 140. Then, protrusions 141b formed on the right and left sides of the first frame 141 are inserted into the recesses 163 formed on the right and left sides of the cover 160. If the cover 160 is coupled to the holder frame 140, external terminals 155 of the protection circuit member 150 are exposed to the outside through external terminal holes 161a formed in the body 161 of the cover 160.

Figure 5F:
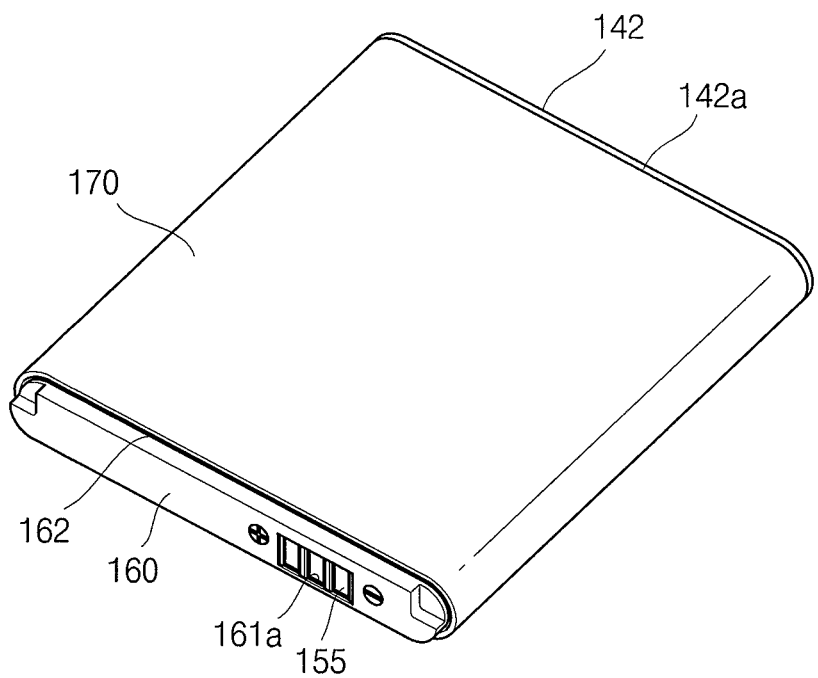

6. Attaching an External Label to the Bare Cell (FIG. 5F)

The external label 170 is attached to the outer peripheral surface of the bare cell 110. Thus, the first and second surfaces 121 and 122 are surrounded by the external label 170 with the bare cell 110 being coupled to the holder frame 140. The external label 170 fixes guide ribs 142a of the second frame 142 of the holder frame 140 and coupling ribs 162 of the cover 160 to the bare cell 110.

Figure 5G:
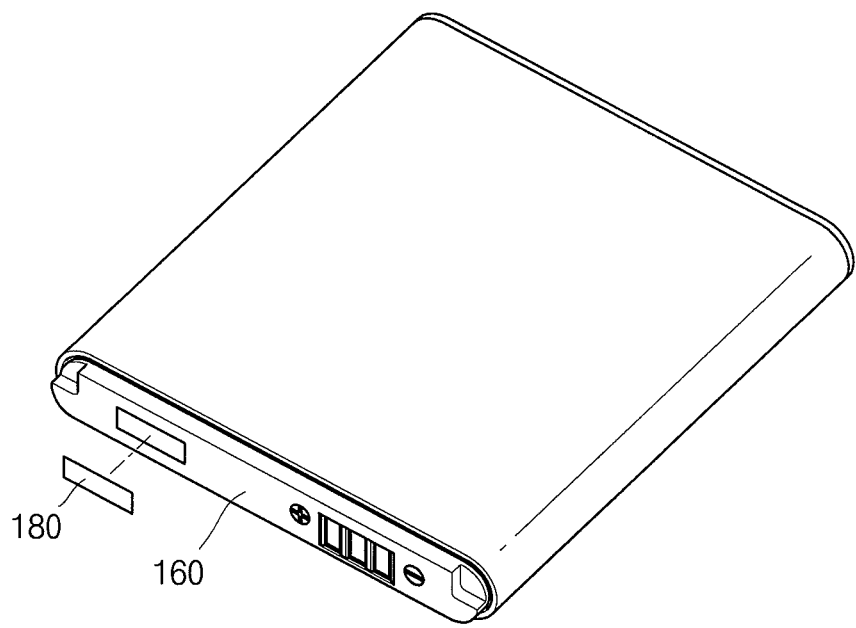

7. Attaching a Water Sensitive Paper and Inspecting a Function of the Battery (FIG. 5G)

Finally, if the water sensitive paper 180 is attached to the cover 160 and the function of the battery is inspected, the manufacturing process of the battery pack is finished.

As mentioned above, in the polymer battery pack 100 according to the embodiment of the present invention, the bare cell 110 is fixed to the inner side of the holder frame 140. Thus, the holder frame 140 protects the third to sixth narrow surfaces 123 to 126 of the bare cell 110. Accordingly, the holder frame 140 also functions as a bottom case protecting the lower end of the bare cell 110.

The protection circuit member 150 is fixed to the outside of the holder frame 140. Accordingly, the holder frame 140 functions as a holder that couples the protection circuit member 150 to the bare cell 110.

The cover 160 coupled to the holder frame 140 protects the protection circuit member 150 and exposes the external terminals 155 to the outside.

The external label 170 finally surrounds the bare cell 110 and fixes the cover 160 to the bare cell 110 and the holder frame 140.

In the method for manufacturing a polymer battery pack according to the embodiment of the present invention, it is unnecessary to inject a hot-melt molding resin into a space between the bare cell and the protection circuit member. It is also unnecessary to install a holder for supporting the protection circuit member. Accordingly, the number of inferior products is minimized and the manufacturing process is simplified.

Next, a polymer battery pack according to another embodiment of the present invention will be described.

Figure 6:
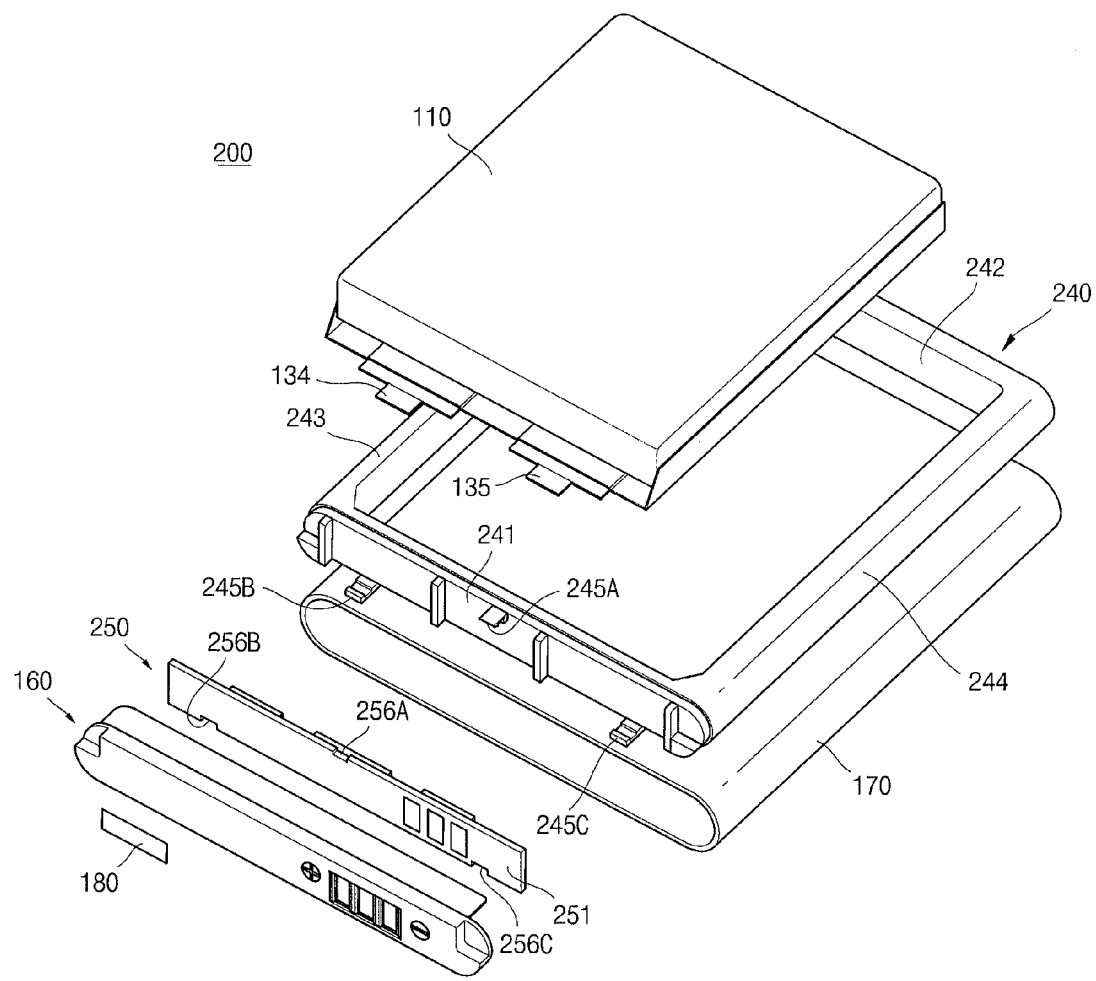
FIG. 6 is an exploded perspective view of a polymer battery pack according to another embodiment of the present invention.
Figure 7:
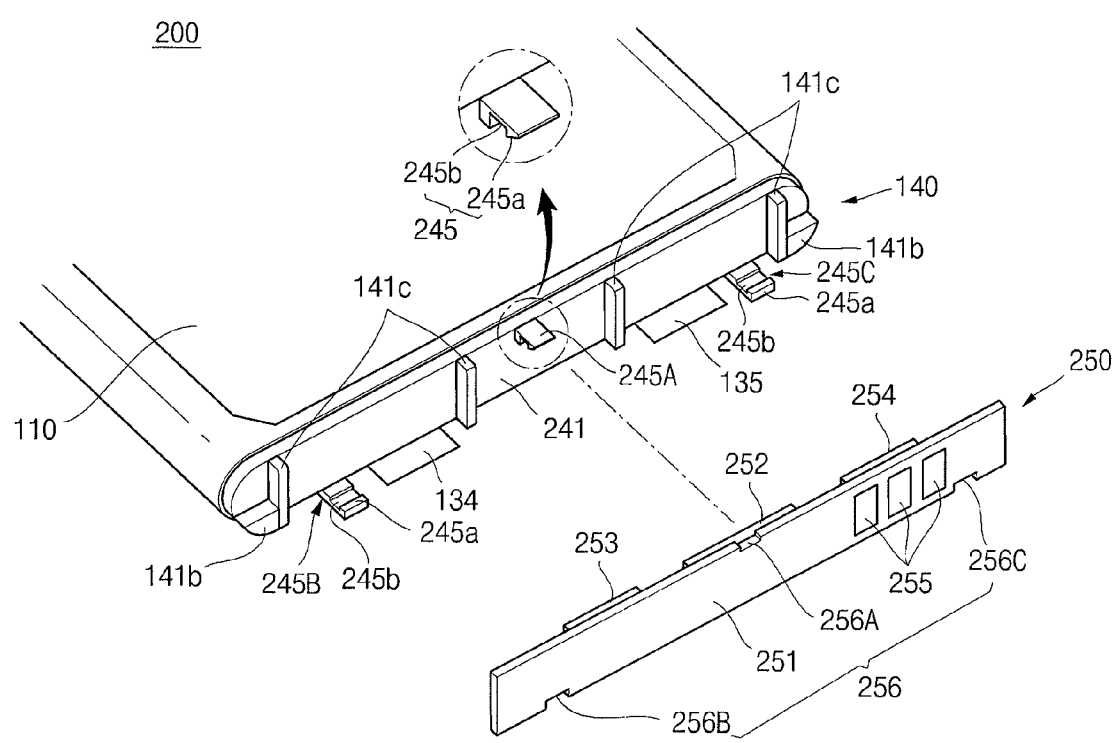
FIG. 7 is a view illustrating a holder frame and a protection circuit member coupled to each other according to the embodiment of the present invention.

FIG. 6 is an exploded perspective view of the polymer battery pack according to the embodiment of the present invention, and FIG. 7 is a view illustrating a holder frame and a protection circuit member coupled to each other according to the embodiment of the present invention.

Referring to FIGS. 6 and 7, the polymer battery pack 200 according to the embodiment of the present invention includes a bare cell 110, a holder frame 240 surrounding the bare cell 110, a protection circuit member 250 electrically connected to the bare cell 110 and fixed to the holder frame 240, and a cover 160 surrounding the protection circuit member 250. The polymer battery pack 200 may further include an external label 170 surrounding the bare cell 110 and the holder frame 240, and a water sensitive paper 180 may be attached to the cover 160.

In the polymer battery pack 200 according to the embodiment of the present invention, since the structures of the bare cell 110, the cover 160, and the external label 170 are the same as those of the first embodiment of the present invention, detailed descriptions thereof will be omitted.

The polymer battery pack 200 according to the embodiment of the present invention provides a coupling structure of the holder frame 240 and the protection circuit member 250.

The holder frame 240 includes two facing first and second frames 241 and 242, and third and fourth frames 243 and 244 integrally formed with opposite ends of the first and second frames 241 and 242 and longer than the first and second frames 241 and 242.

Catching hooks 245 for fixing the protection circuit member 250 are formed on the outer surface of the first frame 241. The catching hooks 245 are formed at the center of one side edge of the first frame 241 and on opposite sides of the other edge thereof. Each catching hook 245 has an inclined portion 245a and a catching recess 245b. The inclined portion 245a is inclined toward the catching recess 245b so as to guide the protection circuit board 251 of the protection circuit member 250 to the catching recess 245b. The catching recess 245b has a size that allows insertion of the protection circuit board 251. The catching hooks 245 are a first catching hook 245A formed at the center of one side edge of the first frame 241 and second and third catching hooks 245B and 245C formed on opposite sides of the other edge thereof.

The protection circuit member 250 includes a protection circuit board 251, an electronic part 252 and electrode leads 253 and 254 installed on one surface of the protection circuit board 251, and several external terminals 255 installed on the opposite surface of the protection circuit board 251.

First to third catching recesses 256A to 256C to which the first to third catching hooks 245A to 245C of the first frame 241 are coupled are formed in the protection circuit board 251. The first catching recess 256A is formed at one side edge of the protection circuit board 251 at a position corresponding to the first catching hook 245A. The second and third catching recesses 256B and 256C are formed at the opposite side edge of the protection circuit board 251 at positions corresponding to the second and third catching hooks 245B and 245C.

Next, the operation of the polymer battery pack according to the embodiment of the present invention will be described.

In the polymer battery pack 200 according to the embodiment of the present invention, the bare cell 110 is installed inside the holder frame 240. The electrode tabs 134 and 135 of the bare cell 110 protrude to the outside of the holder frame 240 and are welded to the electrode leads 253 and 254 of the protection circuit member 250. Accordingly, the bare cell 110 and the protection circuit member 250 are electrically connected to each other.

Thereafter, the protection circuit board 251 is folded toward the first frame 241, and the protection circuit member 250 is mechanically coupled to the holder frame 240. In other words, the first catching hook 245A formed at the center of the first frame 241 is coupled to the first catching recess 256A formed at the center of one side edge of the protection circuit board 251. At the same time, the second and third catching hooks 245B and 245C formed at both ends of the opposite side edges of the first frame 241 are coupled to the second and third catching recesses 256B and 256C formed at both ends of the opposite side edge of the protection circuit board 251. Thus, the protection circuit board 251 is fixed to the first frame 241 at the center and the opposite ends thereof. Accordingly, the protection circuit member 250 is prevented from being easily separated from the holder frame 240 by an external impact. Moreover, the polymer battery pack 200 can be accurately and simply assembled.

In the embodiment of the present invention, the protection circuit board 251 is coupled to the first frame 241 at three positions, but the present invention is not limited thereto. In other words, the protection circuit board 251 may be coupled to the first frame 241 only at the center thereof, or only at both ends thereof. Alternatively, coupling structures may be formed at upper and lower portions of the center of the protection circuit board 251, or at upper and lower portions of both ends thereof. However, the present invention does not limit the positions and numbers of coupling hooks and coupling recesses.

Next, a polymer battery pack according to still another embodiment of the present invention will be described.

Figure 8:
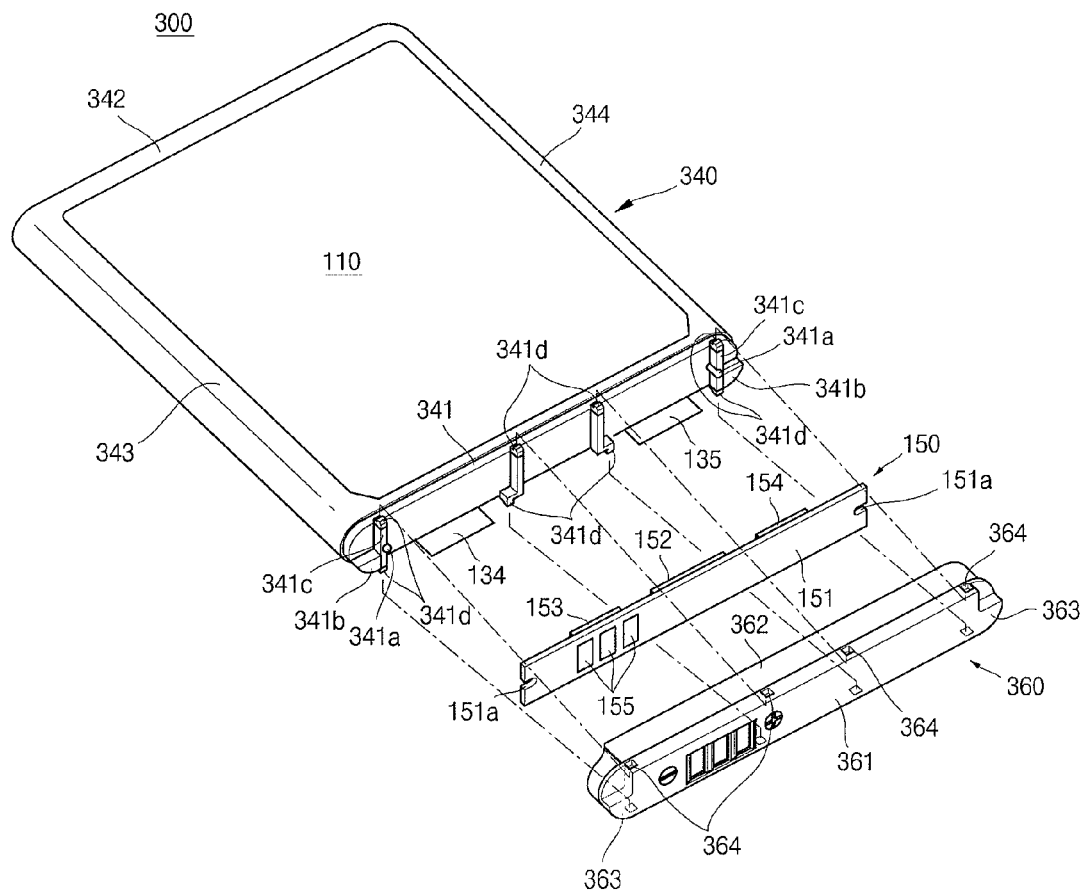
FIG. 8 is an exploded perspective view of a polymer battery pack according to still another embodiment of the present invention.

FIG. 8 is an exploded perspective view of a polymer battery pack according to the embodiment of the present invention.

Referring to FIG. 8, the polymer battery pack 300 according to the embodiment of the present invention includes a bare cell 110, a holder frame 340 surrounding the bare cell 110, a protection circuit member 150 electrically connected to the bare cell 110 and fixed to the holder frame 340, and a cover 360 surrounding the protection circuit member 150.

In the polymer battery pack 300 according to the embodiment of the present invention, since the structures of the bare cell 110 and the protection circuit member 150 are the same as those of the first embodiment of the present invention, detailed descriptions thereof will be omitted and the same elements are endowed with the same reference numerals.

The polymer battery pack 300 according to the embodiment of the present invention provides a coupling structure of the holder frame 340 and the cover 360.

The holder frame 340 includes two facing first and second frames 341 and 342, and third and fourth frames 343 and 344 integrally formed with opposite ends of the first and second frames 341 and 342 and longer than the first and second frames 341 and 342. The first frame 341 includes fixing bosses 341a formed at opposite sides of the outer surface thereof, protrusions 341b formed on the outer side of the fixing bosses 341a, four supports 341c formed on a surface of the first frame 341, and insertion bosses 341d formed at upper and lower ends of the supports 341 respectively.

The protection circuit member 150 has fixing holes 151a formed at right and left ends of the protection circuit board 151 and coupled to the fixing bosses 141a of the first frame 141.

The cover 360 includes a body 361, coupling ribs 362 extending downward from the lower ends of side surfaces of the body 361, recesses 363 formed at opposite ends of the body 361 and into which the protrusions 341b are inserted, and insertion holes 364 to which the insertion bosses 341d are coupled. Accordingly, eight insertion bosses 341d formed in the first frame 141 are inserted into the insertion holes 364 formed in the cover 360 in order to couple the cover 360 to the first frame 141.

Next, the operation of the polymer battery pack according to the embodiment of the present invention will be described.

In the polymer battery pack 300 according to the embodiment of the present invention, the bare cell 110 is installed inside the holder frame 340. The electrode tabs 134 and 135 of the bare cell 110 protrude outside the holder frame 340 and are welded to the electrode leads 153 and 154 of the protection circuit member 150. Thus, the bare cell 110 and the protection circuit member 150 are electrically connected to each other.

The protection circuit board 151 is folded toward the first frame 341, and the fixing bosses 341a of the first frame 341 are inserted into and coupled to the fixing holes 151a of the protection circuit board 151. Then, the protection circuit board 151 is supported by the supports 341c.

Thereafter, the cover 360 is coupled to the first frame 341 of the holder frame 340. Then, the protrusions 341c formed at opposite ends of the first frame 341 are inserted into the recesses 363 of the cover 360. Meanwhile, the insertion bosses 341d formed in the first frame 341 are inserted into and coupled to the insertion holes 364 of the cover 360.

The coupling structure firmly couples the cover 360 to the first frame 341, thereby preventing the cover 360 from being separated from the first frame 341. Accordingly, the protection circuit member 150 is protected from an external impact by the cover 360, and is electrically insulated from the outside, thereby preventing a short circuit.

Figure 9:
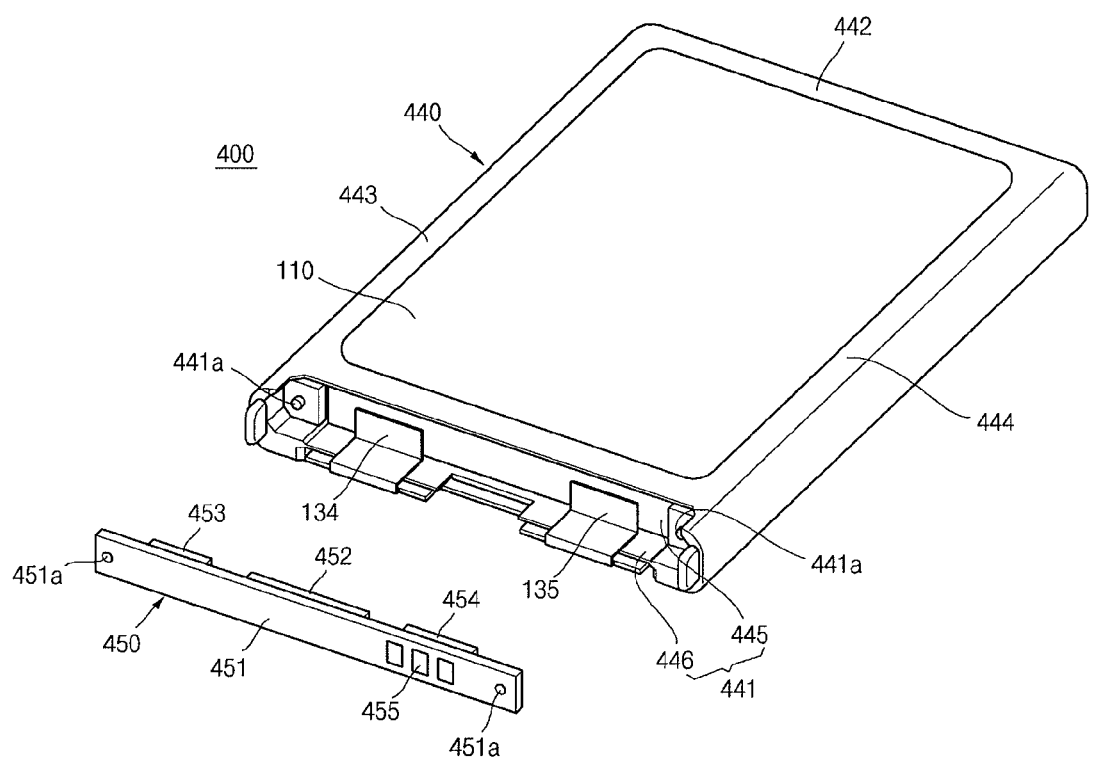
FIG. 9 is an exploded perspective view illustrating an assembly of a holder frame and a protective circuit module of a polymer battery pack according to still another embodiment of the present invention.
Figure 10:
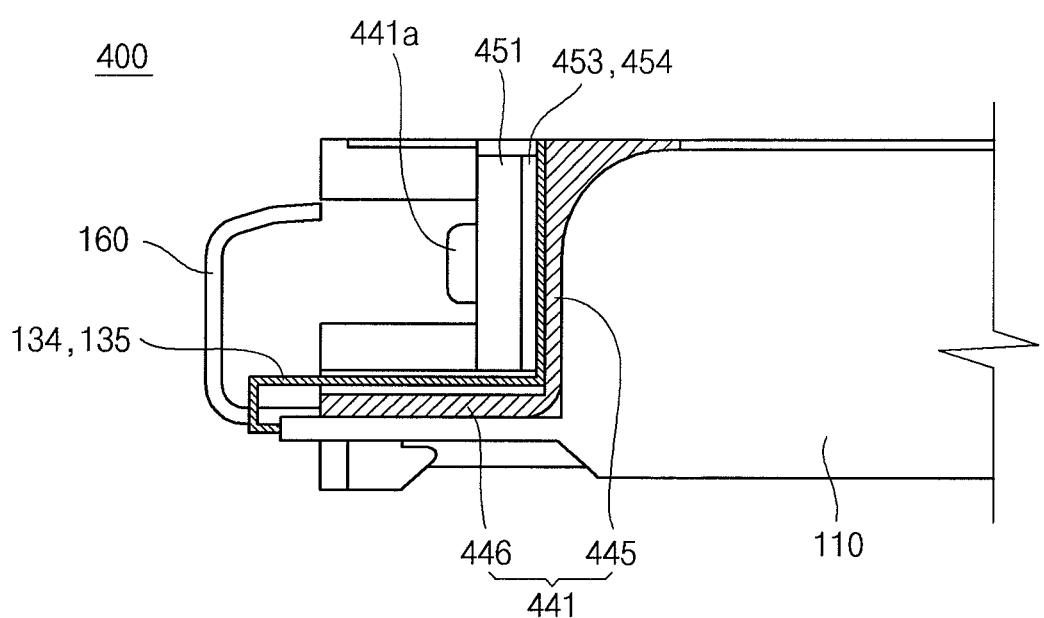
FIG. 10 is a sectional view illustrating an assembly of the polymer battery pack according to still another embodiment of the present invention.

A polymer battery pack according to still another embodiment of the present invention will be described FIG. 9 is an exploded perspective view illustrating an assembly of a holder frame and a protective circuit module of a polymer battery pack according to still another embodiment of the present invention, and FIG. 10 is a sectional view illustrating an assembly of the polymer battery pack according to still another embodiment of the present invention.

Referring to FIGS. 9 and 10, a polymer battery pack 400 according to still another embodiment of the present invention includes a barre cell 110, a holder frame 440 surrounding the bare cell 100, a protective circuit module 450 electrically connected to the bare cell 110 and fixed to the holder frame 440, and a cover 160 surrounding the protective circuit module 450.

Since the bare cell 110 and the cover 160 of the polymer battery pack 400 are identical to those of the polymer battery pack according to the previous embodiment of the present invention, their description will be omitted.

In the polymer battery pack 400 according to still another embodiment of the present invention, the holder frame 440 and the protective circuit module 450 are improved.

The holder frame 440 includes first and second short frames 441 and 442 facing each other, and third and fourth long frames 443 and 444 longer than the first and second frames 441 and 442 and connecting the first and second frames 441 and 442 to each other.

The first frame 441 includes a vertical portion 445 and a horizontal portion 446 horizontally extending from an end of the vertical portion 445. The vertical portion 445 has fixing protrusions 441a protruding from lateral ends of the vertical portion 445. The horizontal portion 446 is parallel to a direction where electrode 134 and 135 of the bare cell 110 are withdrawn. The second, third, and fourth frames 442, 443, and 444 form a space into which the bare cell 110 is seated. For example, the second, third, and fourth framed 442, 443, and 444 may form a rounded space corresponding to the shape of the bare cell 110.

The protective circuit module 450 includes a circuit board 451, an electric device 452 and electrode leads 453 and 454 which are mounted on a surface of the circuit board 451, and a plurality of external terminals 455 formed on an opposite surface of the circuit board 451. The protective circuit module 450 has fixing holes 451a formed in lateral ends of the circuit board 451 into which the fixing protrusions 441 are inserted.

In the polymer battery pack 400 according to still another embodiment of the present invention, the protective circuit module 450 is fixed to the first frame 441 of the holder frame 440. At this time, the fixing protrusions 441a of the first frame 441 are inserted into the fixing holes 451a of the protective circuit module 450. Thus, circuit board 451 contacts closely to the vertical portion 445 of the first frame 441 so that the electrode leads 453 and 454 are electrically connected to the electrode tabs 134 and 135. The circuit board 451 is positioned on the top surface of the vertical portion 446 of the first frame 441. Thus, the horizontal portion 446 protects the circuit board 451 from an external shock.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A battery pack assembly comprising:
a rigid frame having an inner side that defines a first mounting location and an outer side that defines a second mounting location;
a bare cell that is mounted within the rigid frame in the first mounting location, wherein the bare cell includes at least one electrode that extends towards the second mounting location;
a protection circuit module having a first and a second side, wherein the protection circuit module includes at least one electrode lead that is positioned on the first side of the protection circuit module wherein the protection circuit module is mounted in the second mounting location of the frame and wherein the at least one electrode of the bare cell is electrically connected to the at least one electrode lead of the protection circuit module and wherein the protection circuit module and the second mounting location of the frame include a projecting member that extends substantially perpendicularly between the first side of the protection circuit module and the second mounting location and a receptacle formed on an outer lateral edge of the protection circuit module or the second mounting location of the frame that receives the projecting member to retain the protection circuit module on the second mounting location; and
a cover that is positioned so as to cover the protection circuit module and wherein the cover engages with the second mounting location of the frame so as to retain the cover adjacent the outer side of the frame wherein the second mounting location of the frame defines a protrusion and the cover defines a recess that is sized and shaped to receive the protrusion so as to maintain the cover in contact with the frame wherein the protrusion extends in the same direction as the projecting member.

2. The assembly of claim 1, wherein the protection circuit module is mounted to the second mounting location so that the first side of the protection circuit module is positioned proximate the outer surface of the frame.

3. The assembly of claim 1, wherein the frame and the protection circuit module are mechanically coupled together so as to secure the protection circuit module to the frame.

4. The assembly of claim 1, wherein the frame includes a fixing boss and wherein the protection circuit module includes at least one opening that engages with the fixing boss of the frame so as to secure the protection circuit module to the frame.

5. The assembly of claim 1, wherein the frame includes a plurality of supports that provide the second mounting location for the protection circuit module and wherein at least one of the supports includes a fixing boss.

6. The assembly of claim 1, wherein the frame includes a horizontal portion and a vertical portion adjacent the second mounting location of the frame and wherein fixing protrusions are formed in the vertical portion.

7. The assembly of claim 6, wherein the protection circuit module includes openings that engage with the fixing protrusions formed on the vertical portion of the frame and wherein the fixing protrusions are mounted adjacent the outer lateral edges of the vertical portion of the frame and wherein the horizontal portion extends outward so as to protect the protection circuit module from shock.

8. The assembly of claim 1, wherein the frame includes at least one catching hook and wherein the protection circuit module includes at least one catching recess wherein the at least one catching hook and the at least one catching recess are positioned and shaped so as to engage with each other so as to retain the protection circuit module to the frame.

9. The assembly of claim 8, wherein the protection circuit module defines a first and a second side each having two ends and the frame also defines a first and a second side wherein the at least one electrode of the bare cell extends towards the second mounting location so as to be positioned adjacent a first side of the frame and wherein the at least one catching hook is formed on a second side of the frame and the at least one recess is formed on a second side of the protection circuit module so as to engage with each other to secure the protection circuit module to the frame.

10. The assembly of claim 9, wherein the protection circuit module defines a first and a second side each having two ends and the frame also defines a first and a second side and wherein the at least one catching hook and the at least one catching recess comprise a plurality of catching hooks and plurality of catching recesses wherein the plurality of catching hooks include a first catching hook formed in the center of the first side of the frame and is coupled to a first catching recess formed at the center of the first side of the protection circuit module and the plurality of catching hooks further comprise second and third catching hooks formed at both ends of the second side edge of the frame and are coupled to the second and third catching recesses formed at both ends of the second side of the protection circuit module.

11. The assembly of claim 1, wherein the second mounting location of the frame includes two lateral sides and wherein the outer side includes at least one projection that extends outward from at least one of the lateral sides and wherein the cover includes at least one opening that receives the at least one projection of the frame to thereby secure the cover to the frame.

12. A battery pack comprising:
a frame defining an inner recess that comprises a first mounting location and an outer surface that defines a second mounting location;
a bare cell that is mounted within the inner recess of the frame, wherein the bare cell includes at least one flexible electrode; and
a protection circuit module having a first and a second side, wherein the protection circuit module includes at least one electrode lead that is positioned on the first side of the protection circuit module so as to be substantially co-planar with the first side of the protection circuit module wherein the protection circuit module is mounted to the second mounting location and the at least one flexible electrode is contoured so that the flexible electrode is coupled to the at least one electrode lead where the at least one electrode lead of the protection circuit module is substantially co-planar with the first side of the protection circuit module and is interposed between the protection circuit module and the frame and wherein the protection circuit module and the second mounting location of the frame include a projecting member that extends substantially perpendicularly between the first side of the protection circuit module and the second mounting location and a receptacle formed on an outer edge of the protection circuit module of the second mounting location that receives the projecting member to retain the protection circuit module on the second mounting location; and a cover that is positioned so as to cover the protection circuit module and wherein the cover engages with the second mounting location of the frame so as to retain the cover adjacent the outer side of the frame wherein the second mounting location of the frame defines a protrusion and the cover defines a recess that is sized and shaped to receive the protrusion so as to maintain the cover in contact with the frame wherein the protrusion extends in the same direction as the projecting member.

13. The assembly of claim 12, wherein the at least one flexible electrode includes a first section that extends in a first direction having a component perpendicular to the plane of the first side of the protection circuit module and a second section that extends in a second direction that is parallel to the plane of the first side so that the second section is coupled to the at least one electrode lead and is interposed between the protection circuit module and the frame.

14. The assembly of claim 12, wherein the outer surface of the frame defines a protrusion and the protection circuit module defines a recess that is sized and shaped to receive the protrusion so as to maintain the protection circuit module in contact with the frame.

15. The assembly of claim 14, wherein the outer surface of the frame includes two lateral sides and wherein the outer surface includes at least one projection that extends outward from at least one of the lateral sides and wherein the protection circuit module includes at least one opening that receives the at least one projection of the frame to thereby secure the protection circuit module to the frame.

16. The assembly of claim 12, further comprising an external label that is attached to the frame and the protection circuit module so that the protection circuit module, the frame and the bare cell are encased by the external label.

* * * * *